(12) United States Patent
Shen et al.

(10) Patent No.: US 7,377,814 B2
(45) Date of Patent: May 27, 2008

(54) CARD CONNECTOR

(75) Inventors: Guojian Shen, Kunsan (CN);
Ren-Chih Li, Tu-Chen (TW)

(73) Assignee: Hon Hai Precision Ind. Co., Ltd.,
Taipei Hsien (TW)

( * ) Notice: Subject to any disclaimer, the term of this patent is extended or adjusted under 35 U.S.C. 154(b) by 335 days.

(21) Appl. No.: 11/165,718

(22) Filed: Jun. 24, 2005

(65) Prior Publication Data

US 2006/0108420 A1   May 25, 2006

(30) Foreign Application Priority Data

Nov. 25, 2004   (CN) .................. 2004 2 0109597 U

(51) Int. Cl.
*H01R 24/00* (2006.01)

(52) U.S. Cl. ..................................... 439/630

(58) Field of Classification Search ............... 439/630, 439/326, 946, 138, 188; 361/737; 235/441, 235/492

See application file for complete search history.

(56) References Cited

U.S. PATENT DOCUMENTS

| | | | |
|---|---|---|---|
| 5,036,430 A * | 7/1991 | Hills ........................... | 361/684 |
| 6,386,920 B1 | 5/2002 | Sun | |
| 6,666,724 B1 * | 12/2003 | Lwee ......................... | 439/630 |
| 6,669,493 B2 * | 12/2003 | Kuroda ....................... | 439/159 |
| 6,726,508 B2 * | 4/2004 | Watanabe et al. ........... | 439/677 |
| 6,863,751 B1 * | 3/2005 | Chan et al. ................ | 149/19.5 |
| 6,908,321 B1 * | 6/2005 | Lai ............................. | 439/140 |
| 7,083,440 B2 * | 8/2006 | Shen et al. ................. | 439/138 |

* cited by examiner

*Primary Examiner*—Alexander Gilman
(74) *Attorney, Agent, or Firm*—Wei Te Chung

(57) ABSTRACT

A card connector comprises an insulative body (1) defining a first passageway (161) and a second passageway (162) above the first passageway (161) for receiving two cards (6, 7) different in sizes, a plurality of contacts (2) retained in the insulative body (1) and provided with first and second engaging portions (21, 22) exposed in corresponding passageways (161, 162) for electrically connecting with corresponding cards (6, 7), and a discriminating elastic device (41) disposed in an entrance of the first passageway (161) and having a resisting section (412) protruding towards a center of the first passageway (161). The resisting section (412) provides a slant (4121) extending upwardly towards the second passageway (162) at a terminal thereof.

20 Claims, 8 Drawing Sheets

CARD CONNECTOR

BACKGROUND OF THE INVENTION

1. Field of the Invention

The present invention generally relates to a card connector for electronic devices, such as notebooks, digital cameras, PDAs (personal digital assistants) and information terminal devices, and more particular to a card connector capable of accepting two kinds of cards of different sizes in thickness, width and length. The instant application relates to two contemporaneously filed applications having the same applicants, the same title and the same assignee with the instant application.

2. Description of Related Art

In electronic devices, such as notebooks, digital cameras and PDAs, there is a widespread use in recent years of IC cards, PC cards and SD cards, all with a built-in IC component called an IC chip incorporating CPU and memory. Under this circumstance, market demands are growing for card connectors for use with small memory cards, such as IC cards, PC cards and SD cards. Particularly, there is an increasing call for a card connector which is low in height and small in size, can accept a plurality of kinds of cards of different sizes.

An example disclosed in U.S. Pat. No. 6,120,322 provides a memory card connection device, which allows two memory cards of different types to be simultaneously inserted therein. The memory card connection device includes two card connectors stacked on each other and a casing for enclosing the connector assembly. Each card connector has an insulative body defining a plurality of passageways therein for receiving conductive pins with engaging ends of the pins extending beyond a front side of the body. The body defines a first space and a second space in communication with the first space for accommodating different cards. For the different cards should be connected with corresponding pins, the different cards are inserted in corresponding spaces. Therefore, it is necessary for users to remember to insert a card into a correct space, thereby it is not convenient for the use of the card connector. Furthermore, a card is mistaken for another card to be inserted into an incorrect space to connect with inaccurate pins so that the card or the card connector may be destroyed.

It is thus desirable to have a card connector which overcomes the problems discussed above.

SUMMARY OF THE INVENTION

Accordingly, an objection of the present invention is to provide a card connector preventing different cards from improper insertion.

In order to achieve the objection set forth, a card connector in accordance with the present invention comprises an insulative body defining a first passageway and a second passageway above the first passageway for receiving two cards different in sizes, a plurality of contacts retained in the insulative body and provided with first and second engaging portions exposed in corresponding passageways for electrically connecting with corresponding cards, and a discriminating elastic device disposed in an entrance of the first passageway and having a resisting section protruding towards a center of the first passageway. The resisting section provides a slant extending upwardly towards the second passageway at a terminal thereof. When a first card, which is not able to enter into the second passageway, is inserted into the first passageway, the resisting section will be pushed outwards to allow the further insertion to the first passageway; when a second card, which is essentially retained in the second passageway, is inserted into the first passageway, the resisting section will not be pushed and prevent the further insertion to the first passageway, and the slant will lead the insertion to the second passageway.

Other objects, advantages and novel features of the present invention will become more apparent from the following detailed description of the present embodiment when taken in conjunction with the accompanying drawings.

DETAILED DESCRIPTION OF THE INVENTION

Figure 1:
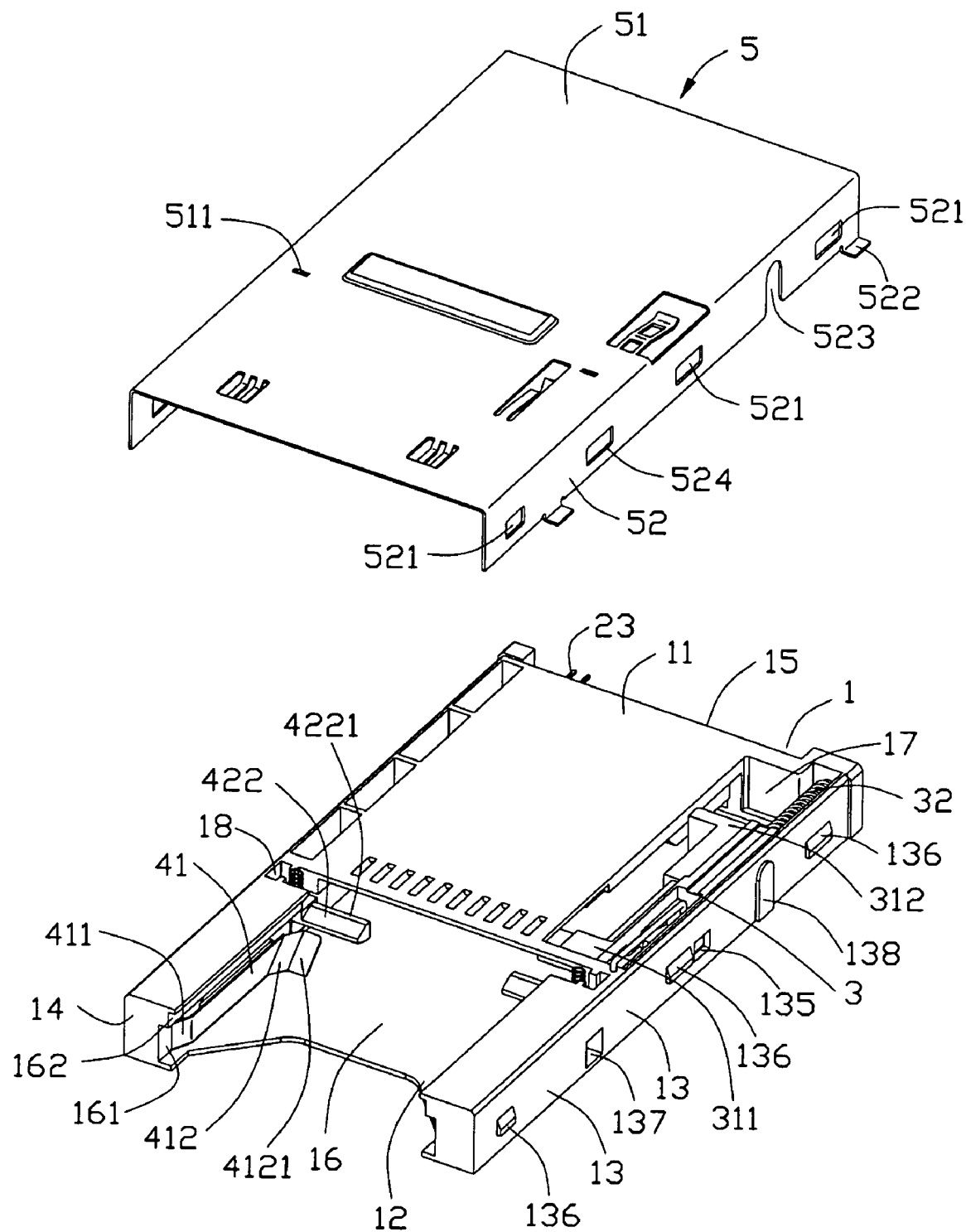
FIG. 1 is a perspective view of a card connector in accordance with the present invention before an shielding member is assembled to an insulative body of the card connector.
Figure 2:
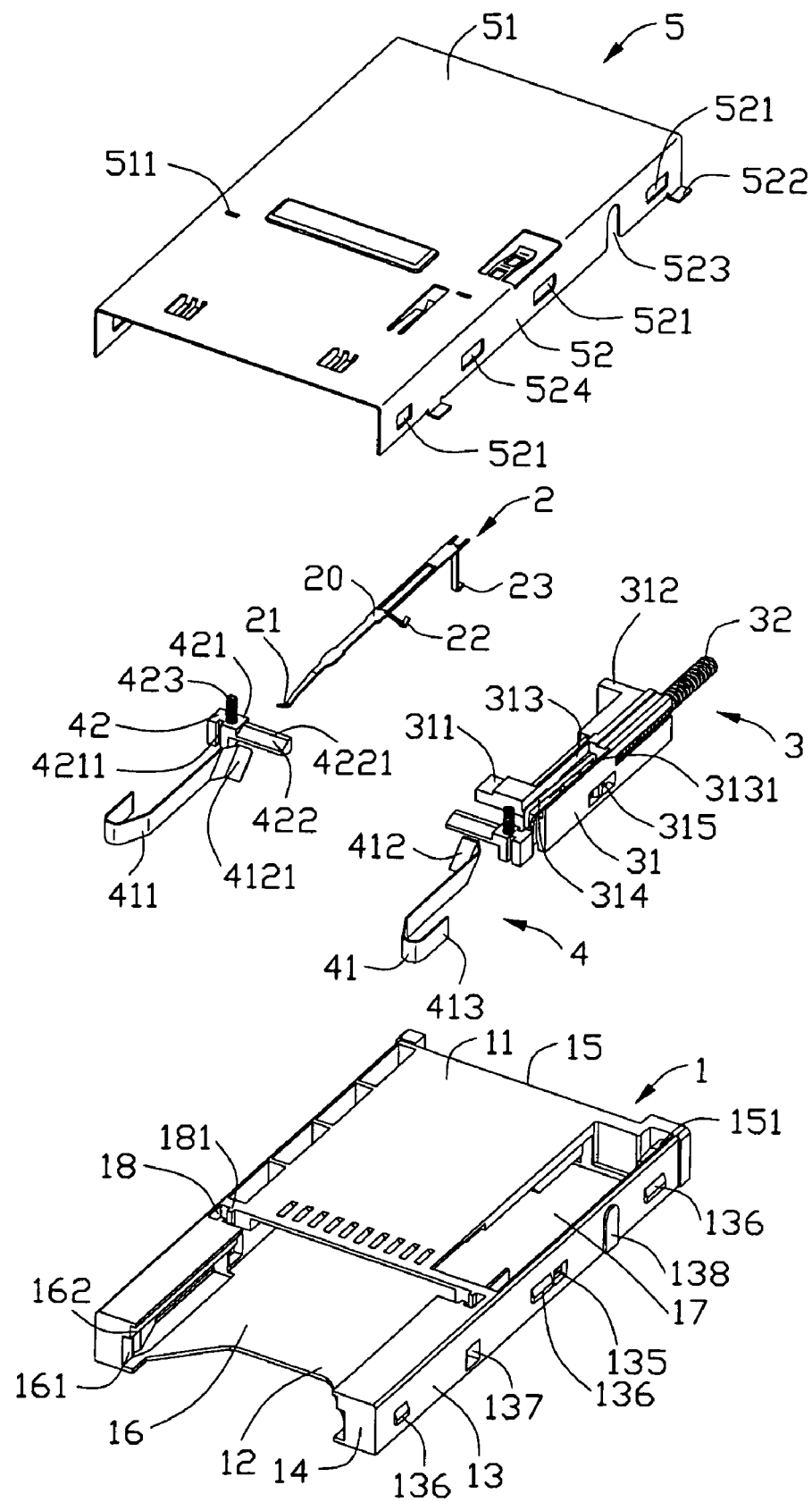
FIG. 2 is a perspective exploded view of the card connector.

As shown in FIGS. 1 and 2, the card connector according to the present invention includes an insulative body 1, a plurality of contacts 2, a card release mechanism 3, switching mechanisms 4 and a shielding member 5. The switching mechanisms 4 of the card connector of the present invention comprise discriminating elastic devices 41 and supporting devices 42. In use, this card connector is mounted, for example, on an information terminal device.

The card connector of the present invention has a flat box-shaped housing defined by the insulative body 1 and the shielding member 5 that is used in combination with the insulative body 1. The insulative body 1 has a top wall 11, a bottom wall 12, a pair of sidewalls 13, a front surface 14, a rear wall 15 and a receiving room 16 defined by said walls. The receiving room 16 is divided into a first passageway 161 and a second passageway 162 for receiving two different cards, which are both extending from the front surface 14 to the rear wall 15 and communicating with each other. An opening for inserting a card is defined on the front surface 14 communicating with the receiving room 16 and the top wall 11 is so sized to leave the bottom wall 12, the pair of sidewalls 13, the first and second passageway 161, 162 open almost at their front halves. Further, the first passageway 161 is under the second passageway 162 and the width of the first passageway 161 is bigger than that of the second passageway 162. Otherwise, a space 17 is defined by a cutout, which is cut on the top wall 11 adjacent to the right sidewall 13, communicating with the receiving room 16. The insulative body 1 further defines a pair of slots 18, each of which is disposed between a rear end of the front half of the sidewall 13 and a front edge of the top wall 11.

The plurality of contacts 2 are retained in a rear half of the receiving room 16. Each contact 2 has a base portion 20, a first engaging portion 21 extending ahead from the base portion 20, a second engaging portion 22 extending rearwards and downwards from the base portion 20, and a soldering tail 23 formed at a rearmost of the base portion 20 and protruding from the rear wall 15 of the insulative body 1 for connecting to a printed circuit board (PCB) (not shown). The first engaging portion 21 and the second engaging portion 22, which are adapted for electrically engaging with corresponding cards, are respectively exposed in the second passageway 162 and the first passageway 161.

The card release mechanism 3 is retained in the space 17 of the insulative body 1. The card release mechanism 3 has a base portion 31, and a spring 32 with one end secured in the base portion 31 and the other end extending outwards to elastically conjugate with a guide post 151 protruding inwards from the rear wall 15 of the insulative body 1. The base portion 31 has a first card release block 311, a second card release block 312 much thicker than the first card release block 311, a recess 313 providing a heart groove 3131, and a card release bar 314 with one end retained in the recess 313 and the other end extending outwards to be secured in the right sidewall 13 of the insulative body 1. The card release bar 314 is able to move in the heart groove 3131. Further, a top surface of the first card release block 311 is on a plane with that of the second card release block 312. In addition, the base portion 31 is formed with a spring tab 315 at a sidewall thereof so as to cooperate with a hole 135 defined in the right sidewall 13 of the insulative body 1.

Figure 3:
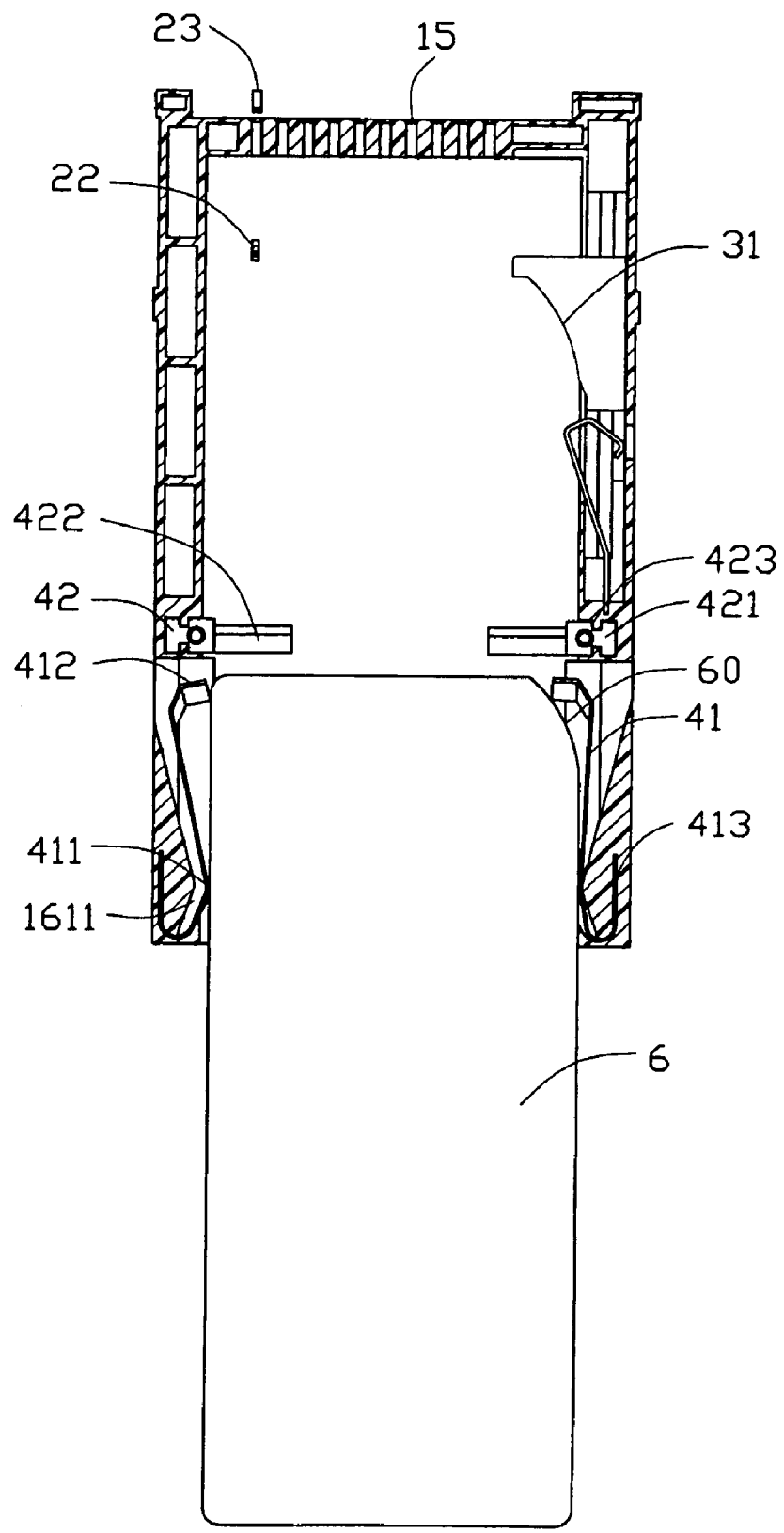
FIGS. 3-5 are cross-sectional views showing a thick, long, large card being inserted into the card connector.

The discriminating elastic device 41 of the switching mechanism 4 is assembled in the front half of the first passageway 161 of the insulative body 1. The discriminating elastic device 41 has an engaging section 411, a resisting section 412 curving inwards at a rear end of the engaging section 411 and a securing section 413 curving outwards at a front end of the engaging section 411. The resisting section 412 has a slant 4121 at a terminal thereof. In assembly, the securing section 413 is secured in a groove 1611 (as shown in FIG. 3) defined in the first passageway 161 of the insulative body 1 in order that the discriminating elastic device 41 is fixed to the insulative body 1, and so that the engaging section 411 and the resisting section 412 are protruding towards a center of the receiving room 16.

The supporting device 42 of the switching mechanism 4 is assembled in the slot 18 and has a mounting block 421, a supporting bar 422 protruding from the mounting block 421 to the receiving room 16 and a short spring 423 protruding upwardly and perpendicularly to the supporting bar 422 from the mounting block 421. The supporting bar 422 is located back of the resisting section 412 of the discriminating elastic device 41 and in front of the first engaging portions 21 of the contacts 2 seen from the front surface 14 to the rear wall 15 of the insulative body 1. Furthermore, the supporting bar 422 is configured with a triangle cross-section and further forms a plane at a top 4221 thereof. The top 4221 of the supporting bar 422 is originally located under an interface formed between the first passageway 161 and the second passageway 162. Otherwise, the mounting block 421 defines two grooves 4211 respectively at a front wall and a rear wall thereof for cooperating with two upright flanges 181 formed at opposite surfaces of the slot 18 so that the mounting block 421 is able to move perpendicularly to the bottom wall 12 of the insulative body 1.

The shielding member 5 is assembled onto the insulative body 1 from the top wall 11 to the bottom wall 12 and has a top wall 51 and a pair of sidewalls 52 extending vertically from the top wall 51. The top wall 51 is provided with two hollow dots 511 to cooperate with the short springs 423 of the supporting devices 42. The sidewall 52 defines three cutouts 521 arranged at intervals so as to cooperate with three protrusions 136 arranged at intervals on the sidewall 13 of the insulative body 1 and a mounting groove 523 disposed between the rear two cutouts 521 so as to cooperate with a mounting protrusion 138 disposed between the rear two protrusions 136, together for securing the shielding member 5 on the insulative body 1. Otherwise, the sidewall 52 defines another cutout 524, which is located between the front two cutouts 521, to communicate with a through hole 137 defined between the front two protrusions 136, and provides two soldering tabs 522 for soldered on the PCB.

The card connector of the present invention may use "Memory Stick"® as a thick, long, large card 6 and "Memory Stick Duo"® as a thin, short, small card 7. The present invention, however, is not limited to the use of these cards or memory sticks but can also be applied satisfactorily to other memory cards.

Figure 4:
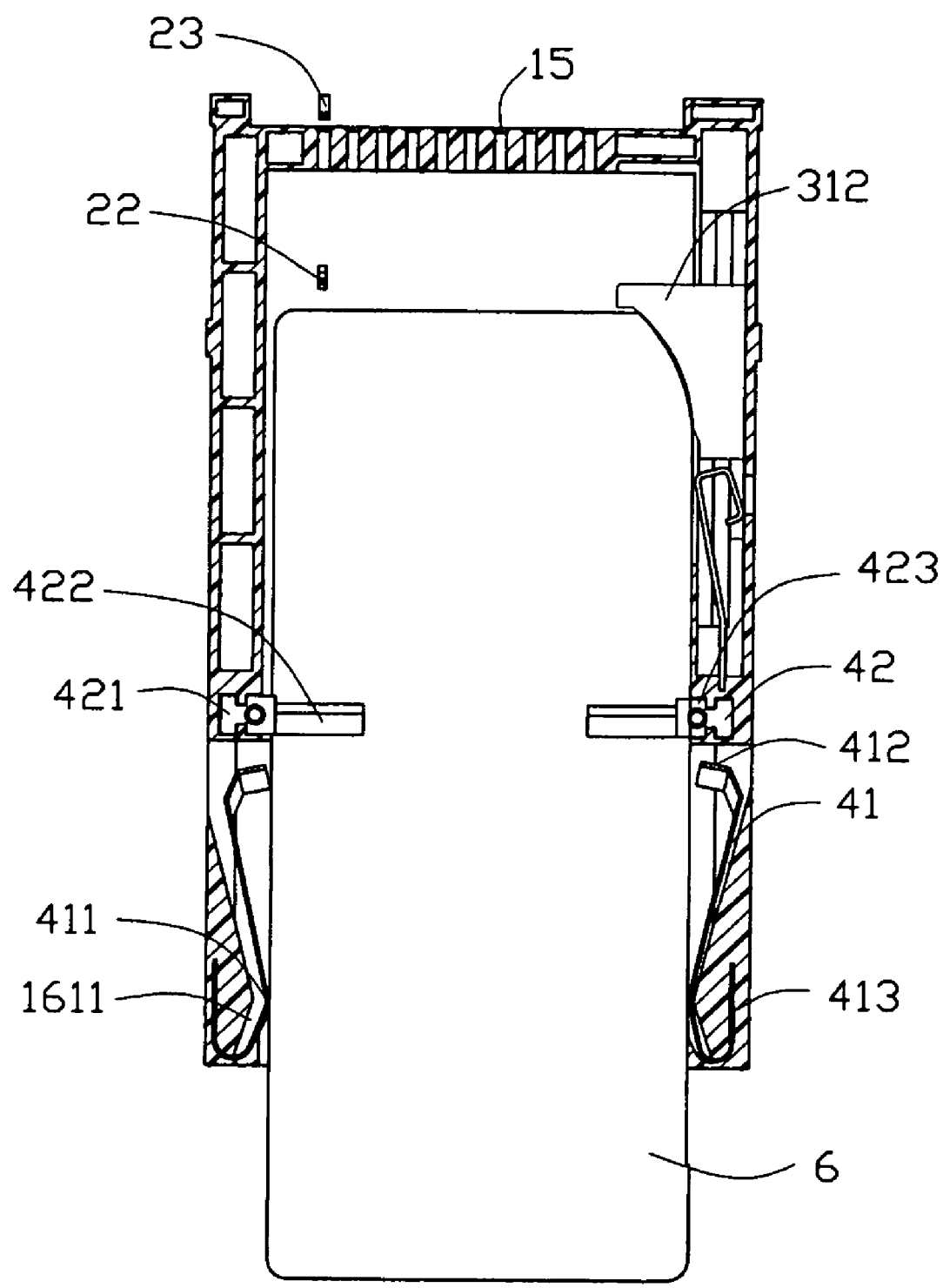
Figure 5:
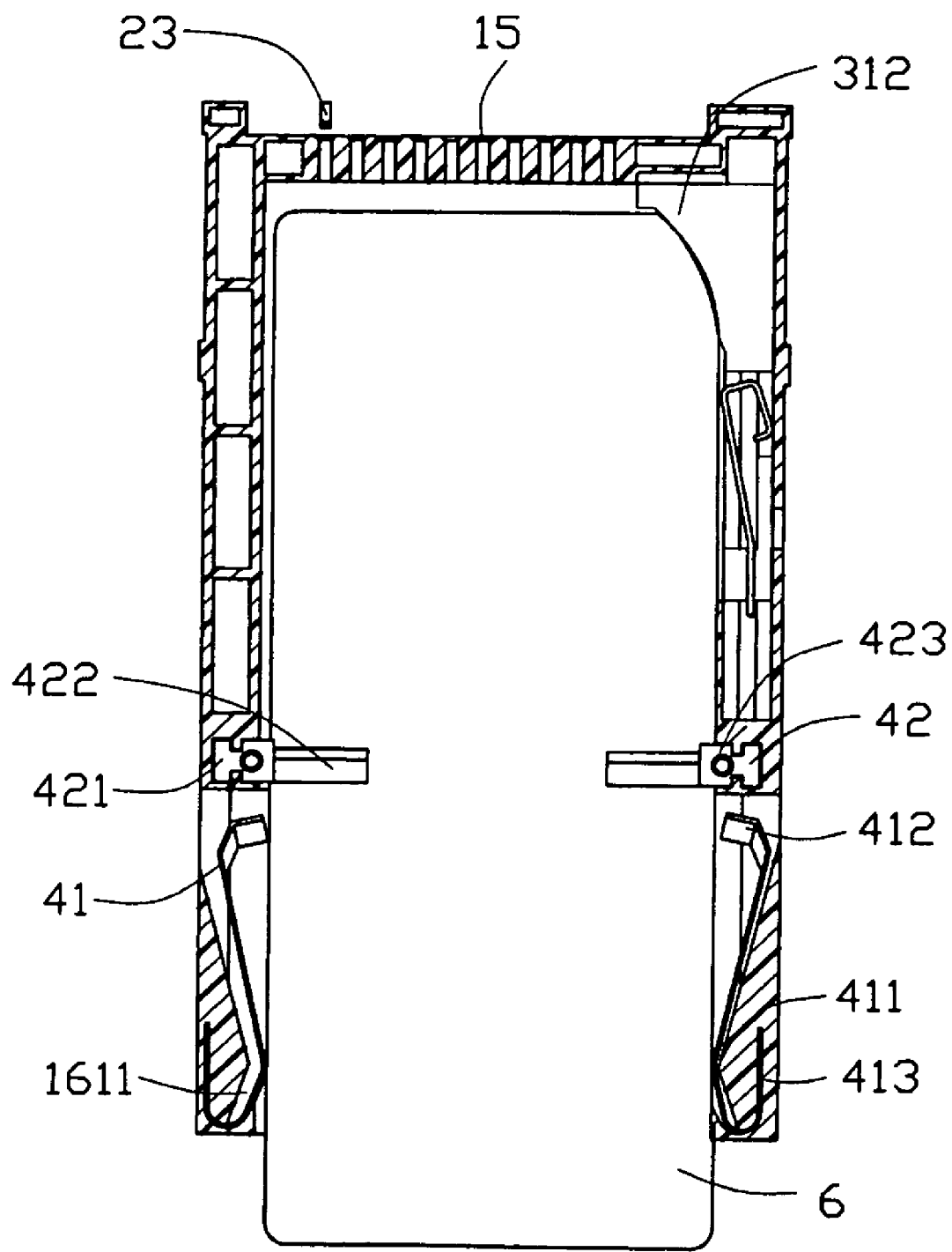

Further, referring to FIGS. 3-5 together with FIGS. 1-2, when the thick, long, large card 6 (simplified as a large card 6) is inserted into the receiving room 16, since the width of the large card 6 is bigger than that of the second passageway 162, the large card 6 can not enter into the second passageway 162 so as to prevent an inserting mistake and effectively prevent the large card 6 from being destroyed. Therefore, the large card 6 enters into the first passageway 161. Then, when the large card 6 is engaging with and acting an outward force on the engaging sections 411 of the discriminating elastic devices 41, the discriminating elastic devices 41 are opening outwards, subsequently, the resisting sections 412 are opening outwards and then respectively retained in the through holes 137 of the insulative body 1, as a result, the large card 6 is further engaging with the supporting bars 422 of the supporting devices 42. For the large card 6 has a sunk section 60 at a front corner thereof, the large card 6 firstly engages with a slope of the supporting bar 422, which inclines rearwards and downwards. While the large card 6 is further being inserted, the supporting bars 422 are moving upwardly and then the mounting blocks 421 are also moving upwardly with the short springs 423 being pressed until bottom surfaces of the supporting bars 422 are on the same plane with the interface formed between the first passageway 161 and the second passageway 162, so the large card 6 is entering along the bottom surfaces of the supporting bars 422 and passing the first card release block 311 of the card release mechanism 3. Sequentially, the large card 6 is engaging with the second card release block 312 and further pushing the second card release block 312 towards the rear wall 15 of the insulative body 1 with the spring 32 being pressed, until the large card 6 is completely inserted in the receiving room 16 and made contact with the second engaging portions 22 of the contacts 2. Lastly, when the large card 6 is continuously being pushed, the large card 6 is able to be released by the card release bar 314 moving in the heart groove 3131 of the card release mechanism 3 and then the supporting device 42 moves downwardly at the force of the pressed short spring 423.

Figure 6:
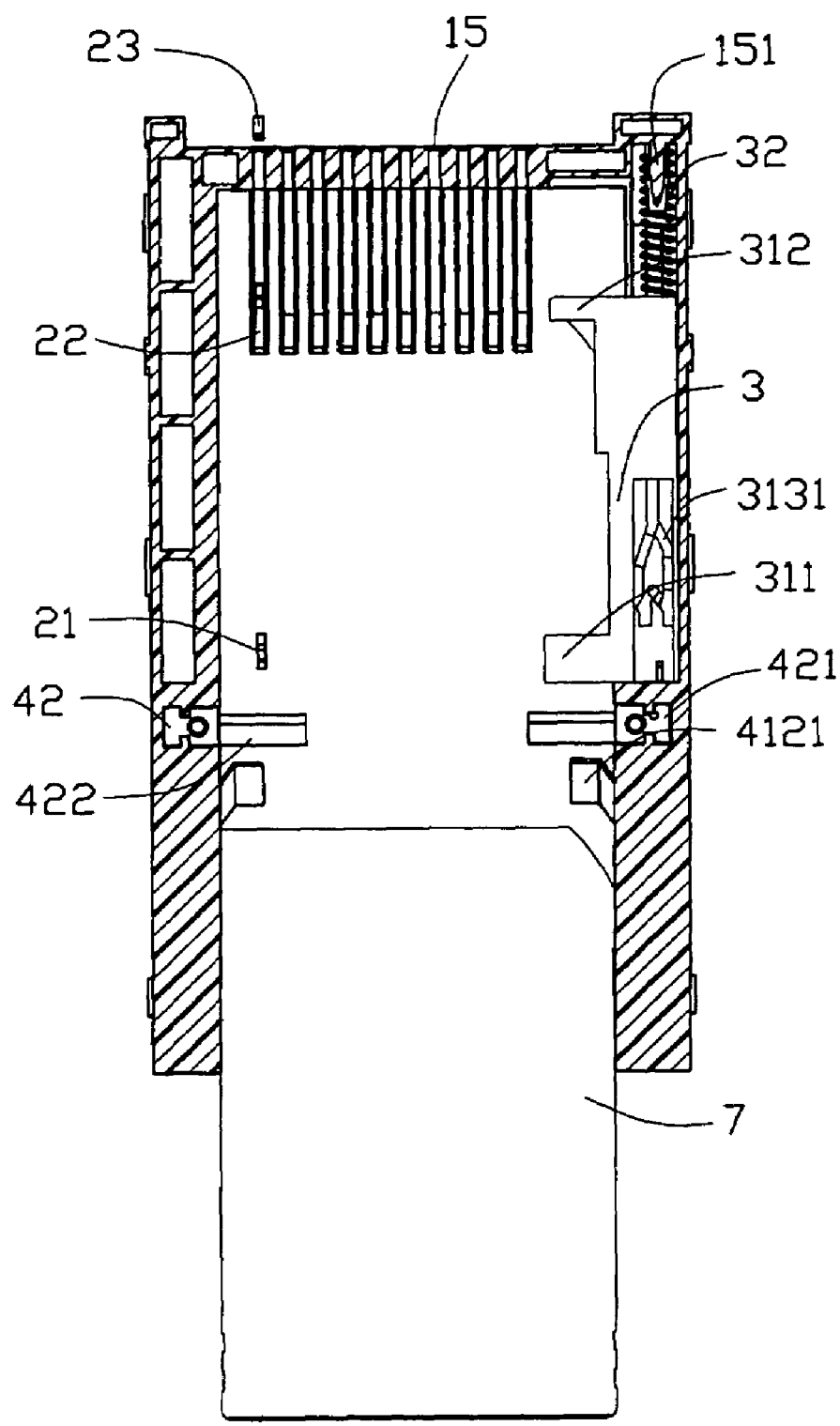
FIGS. 6-8 are cross-sectional views showing a thin, short, small card being inserted into the card connector.
Figure 7:
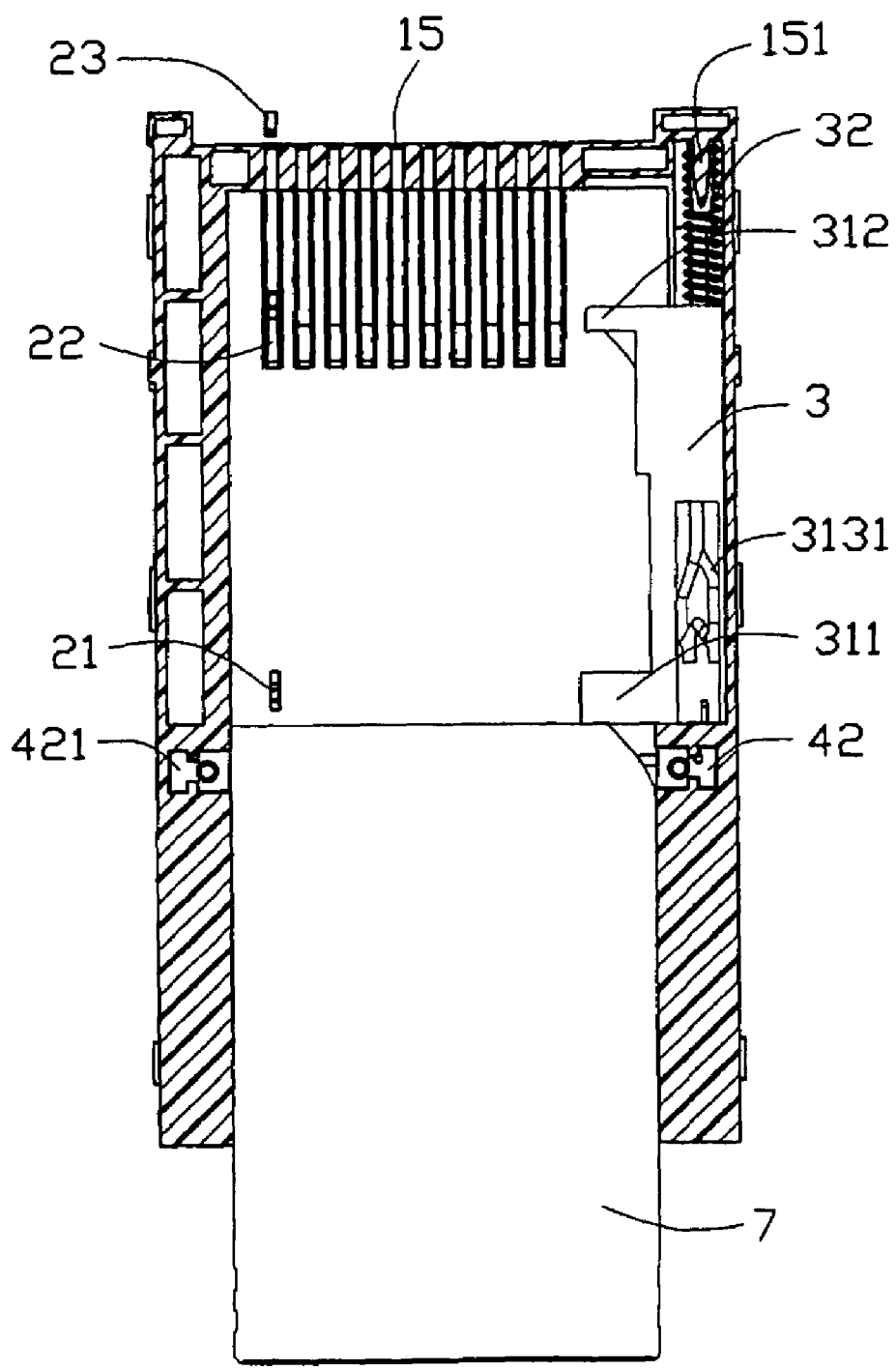
Figure 8:
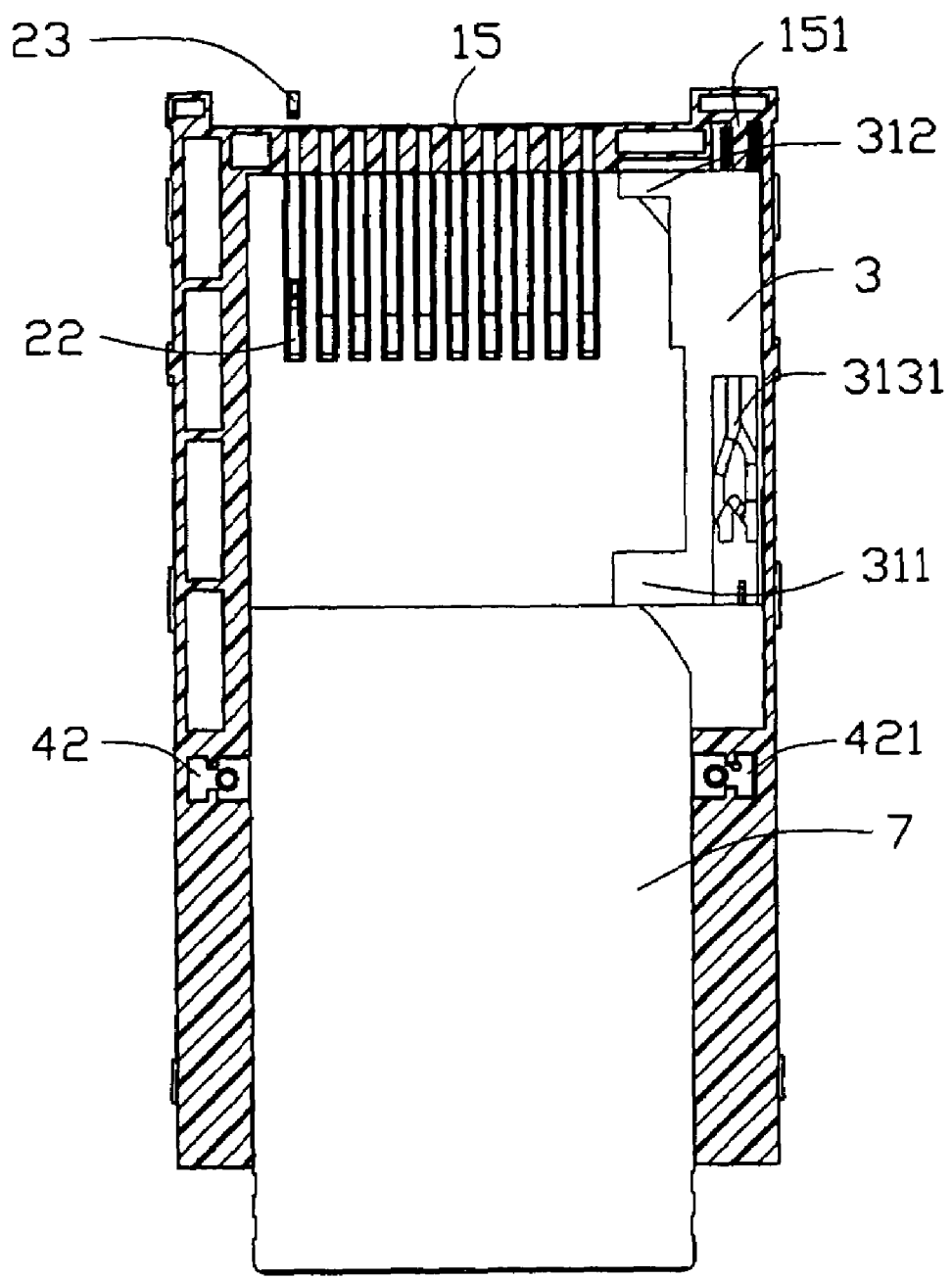

Finally, referring to FIGS. 6-8 together with FIGS. 1-2, when the thin, short, small card 7 (simplified as a small card 7), of which the width is smaller than that of the second passageway 162, is being inserted into the second passageway 162, the small card 7 is then moving on the top 4221 of the supporting bars 422 of the supporting devices 42, further engaging with the first card release block 311 of the card release mechanism 3 and pushing the first card release block 311 towards the rear wall 15 of the insulative body 1 with the spring 32 being pressed, until the small card 7 is completely inserted in the receiving room 16 and made contact with the first engaging portions 21 of the contacts 2. In the same way, when the small card 7 is continuously being pushed, the small card 7 is able to be released by the card release bar 314 moving in the heart groove 2131 of the card release mechanism 3.

When the small card 7 is being inserted into the first passageway 161, the small card 7 can not engage with the engaging sections 411 of the discriminating elastic devices 41, because the size of the small card 7 is not adequate big. That is, the engaging sections 411 can not open outwards and so the resisting sections 412 can not either open outwards. In this way, when the small card 7 is further being inserted, the resisting sections 412 prevent the small card 7 from entering. However, the small card 7 is moving along the slants 4121 of the resisting sections 412 and then on the top 4211 of the supporting bars 422 of the supporting devices 42, finally entering into the second passageway 162 and made contact with the first engaging portions 21 of the contacts 2. Accordingly, even though the small card 7 is firstly inserted into the first passageway 161, it enters into the second passageway 162 finally.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card connector comprising:
   an insulative body defining a first passageway and a second passageway
   above the first passageway for receiving two cards different in sizes;
   a plurality of contacts retained in the insulative body and provided with first and second engaging portions exposed in corresponding passageways for electrically connecting with corresponding cards; and
   a discriminating elastic device disposed in an entrance of the first passageway and having a resisting section protruding towards a center of the first passageway, the resisting section providing a slant extending upwardly towards the second passageway at a terminal thereof; wherein
   when a first card, which is not able to enter into the second passageway, is inserted into the first passageway, the resisting section will be pushed and distort elastically outwards to allow a further insertion of the first card in the first passageway; when a second card, which is essentially retained in the second passageway, is inserted into the first passageway, the resisting section will not be pushed and prevent the further insertion to the first passageway, and the slant will lead the insertion to the second passageway.

2. The card connector as described in claim 1, wherein the insulative body defines a through hole in a sidewall thereof, when the resisting section of the discriminating elastic device is pushed outwards at a force of the first card, the resisting section is then accommodated in the through hole.

3. The card connector as described in claim 1, further comprising a shielding member assembled onto the insulative body.

4. The card connector as described in claim 3, further having a first card release block and a second card release block much thicker than the first card release block.

5. The card connector as described in claim 4, wherein a top surface of the first card release block is on the same plane with that of the second card release block.

6. The card connector as described in claim 1, wherein the discriminating elastic device further having an engaging portion proximate the entrance of the first passageway and protruding towards the center of the first passageway.

7. The card connector as described in claim 6, wherein the resisting portion follows the engaging portion being pushed outwards by the first card to move outwards.

8. The card connector as described in claim 1, further having a first card release block and a second card release block much thicker than the first card release block.

9. The card connector as described in claim 8, wherein a top surface of the first card release block is on the same plane with that of the second card release block.

10. A card connector comprising:
    an insulative body defining a receiving room divided into a first passageway
    and a second passageway above the first passageway, the passageways communicating with each other for receiving two cards different in sizes;
    a plurality of contacts retained in the insulative body and provided with first and second engaging portions exposed in corresponding passageways for electrically connecting with corresponding cards;
    a discriminating elastic device disposed in an entrance of the first passageway and having a resisting section protruding towards a center of the first passageway, the resisting section providing a slant extending upwardly towards the second passageway at a terminal thereof; and
    a supporting device disposed at back of the discriminating elastic device and movable between the first and second passageways, the supporting device having a supporting bar protruding towards a center of the receiving room; wherein
    when a first card, which is not able to enter into the second passageway, is inserted into the first passageway, the resisting section will be pushed outwards and the supporting bar will be pushed upwardly to allow the further insertion to the first passageway; when a second card, which is essentially retained in the second passageway, is inserted into the first passageway, the resisting section will not be pushed and prevent the further insertion to the first passageway, and the slant will lead the insertion to the second passageway and further the supporting bar will hold the second card in the second passageway.

11. The card connector as described in claim 10, wherein the insulative body defines a through hole in a sidewall thereof, when the resisting section of the discriminating elastic device is pushed outwards at a force of the first card, the resisting section is then accommodated in the through hole.

12. The card connector as described in claim 10, wherein the discriminating elastic device further having an engaging portion proximate the entrance of the first passageway and protruding towards the center of the first passageway.

13. The card connector as described in claim 12, wherein the resisting portion follows the engaging portion being pushed outwards by the first card to move outwards.

14. The card connector as described in claim 10, wherein the first card firstly engages with a slope of the supporting bar of the supporting device, the slope inclines rearwards and downwards.

15. The card connector as described in claim 14, wherein the supporting bar forms a plane at a top thereof and the plane is originally located under an interface formed between the first and second passageways.

16. The card connector as described in claim 15, wherein the supporting bar is configured with a triangle cross-section.

17. The card connector as described in claim 16, wherein the supporting device further defines two grooves respectively at a front and rear wall thereof and the grooves are able to move along two upright flanges fanned at opposite surfaces of the insulative body.

18. The card connector as described in claim 17, wherein the supporting device further has a spring projecting upwardly to the second passageway.

19. A card connector comprising:
an insulative body defining vertically arranged first and second passageways far receiving two different type cards having different widths thereof;
a plurality of contacts received in the housing for electrically connecting to the corresponding cards; and
a one piece moveable discriminating device located around a common entrance of the housing, said discriminating device including a front engaging section and a rear guiding section; wherein when a narrow card is inserted into the common entrance, the engaging section will not be actuated and the discrimination device essentially does not move so as to have the inserted narrow card moved, by means of the rear guiding section further in a vertical direction perpendicular to an insertion direction of the card to assure the narrow card is received in the first passageway and mated with the corresponding contacts; when a wide card is inserted into the entrance, the engaging section will be actuated and the discriminating device essentially moves so as to have the inserted side card moved without being affected by the rear guiding section to assure the wide card is received in the second passageway and mated with the corresponding contacts.

20. The card connector as claimed in claim 19, wherein said moveable discriminating device is elastically deflectable during confrontation with the wide card.

* * * * *